Figure 7:
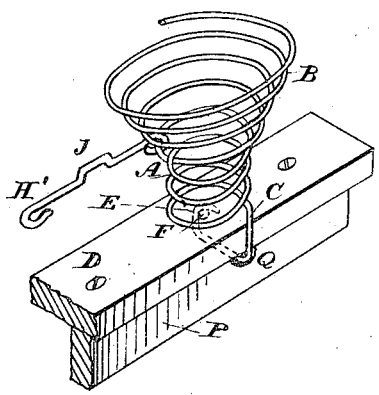

(No Model.)
A. F. PUREFOY.
SPRING BED BOTTOM.
No. 261,954. Patented Aug. 1, 1882.
3 Sheets—Sheet 1.
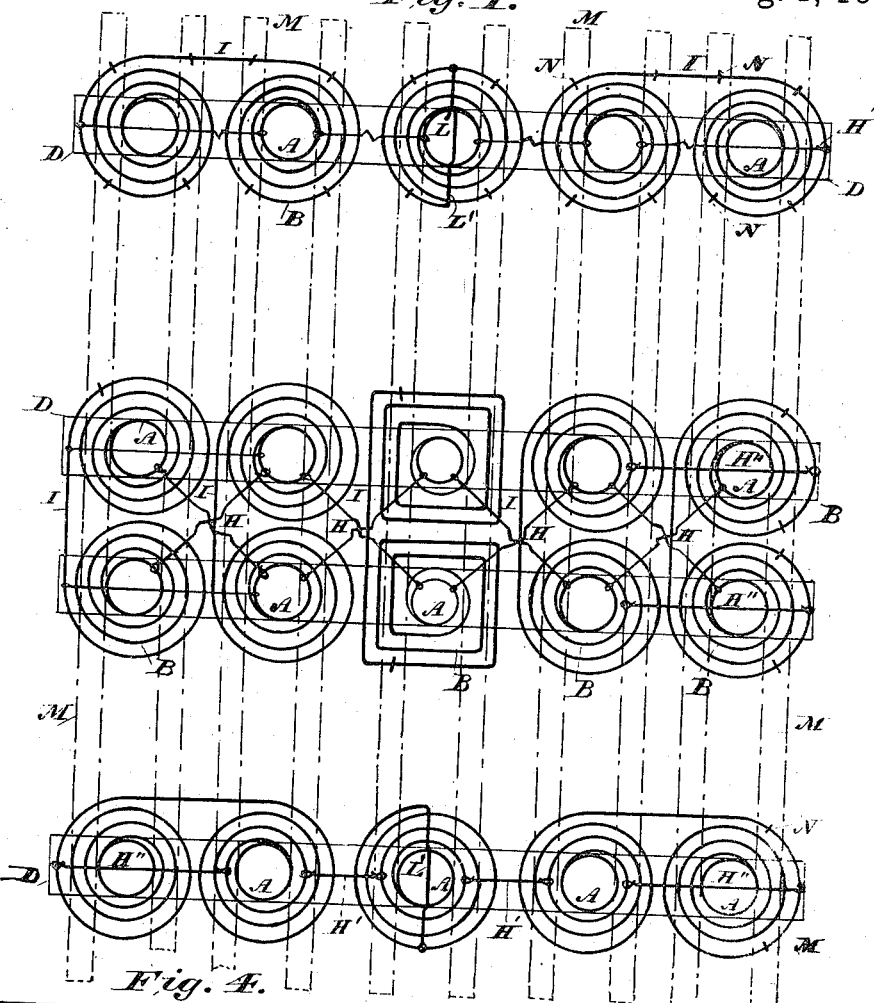
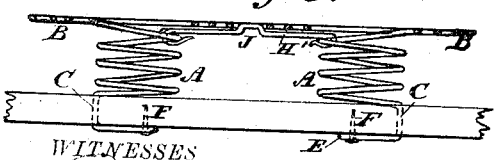
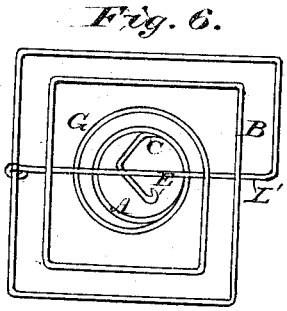
WITNESSES
INVENTOR
Addison F. Purefoy
by Chas. J. Hedrick
Attorney (No Model.)  3 Sheets—Sheet 2.
A. F. PUREFOY.
SPRING BED BOTTOM.
No. 261,954. Patented Aug. 1, 1882.
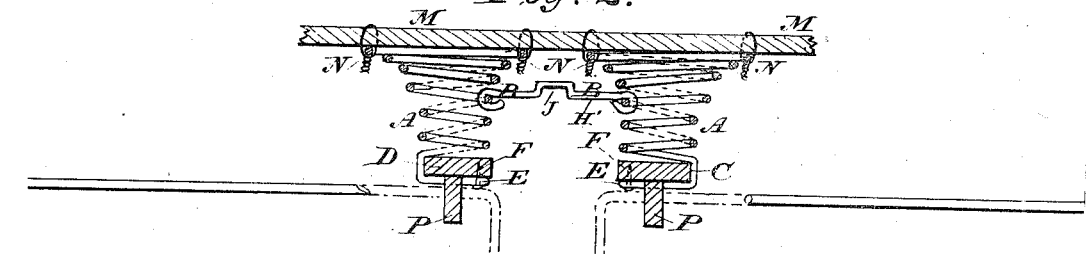
Fig. 2.
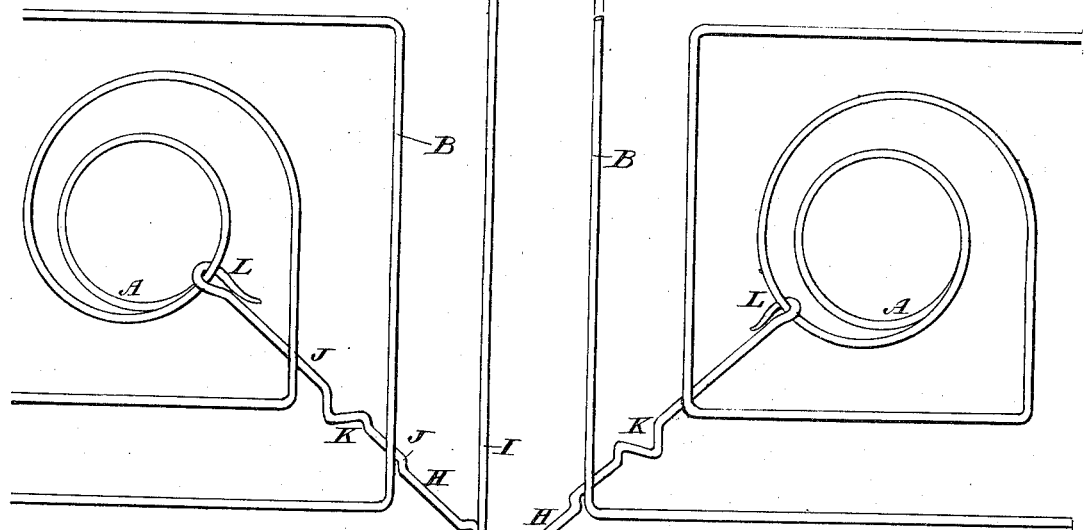
Fig. 3.
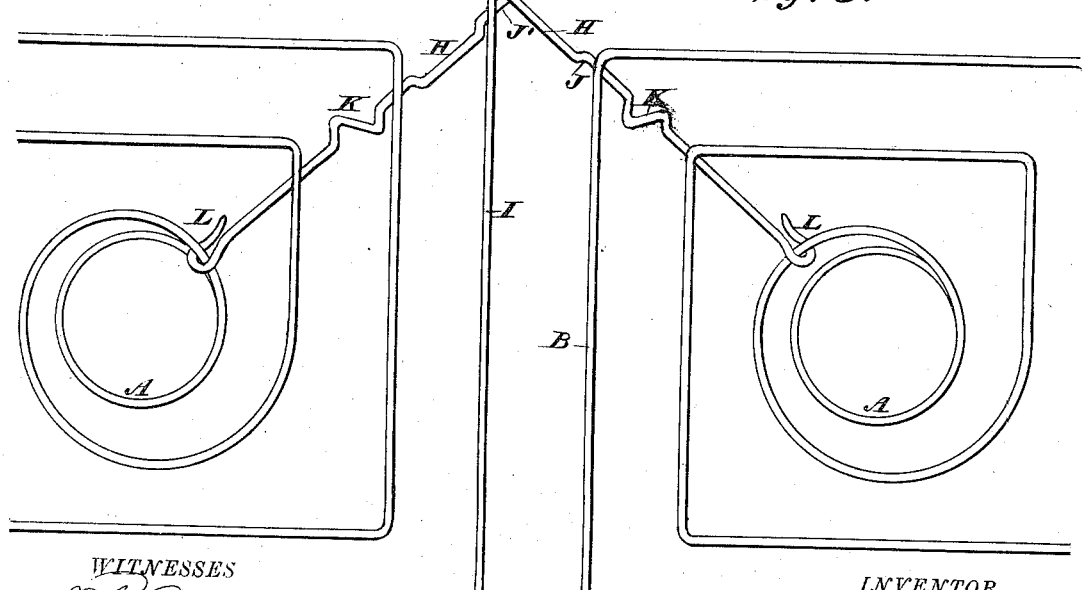
WITNESSES
T. C. Brecht
Philip Mauro
INVENTOR
Addison F. Purefoy
By Chas. J. Hedrick
Attorney (No Model.)

3 Sheets—Sheet 3.

A. F. PUREFOY.
SPRING BED BOTTOM.

No. 261,954. Patented Aug. 1, 1882.

WITNESSES

INVENTOR
Addison F. Purefoy
by Chas. J. Hedrick
Attorney

UNITED STATES PATENT OFFICE.

ADDISON F. PUREFOY, OF WAKE FOREST, NORTH CAROLINA, ASSIGNOR OF ONE-FOURTH TO SIDNEY ABERNATHY, OF SAME PLACE.

SPRING BED-BOTTOM.

SPECIFICATION forming part of Letters Patent No. 261,954, dated August 1, 1882.

Application filed May 31, 1882. (No model.)

*To all whom it may concern:*

Be it known that I, ADDISON F. PUREFOY, of Wake Forest, county of Wake, and State of North Carolina, have invented a certain new and useful Improvement in Spring Bed-Bottoms, whereof the following specification is a full description.

This invention has for its object to produce a bed-bottom durable, comfortable in use, and economical of manufacture, and relates to the shape of the tops of the springs, to the fastening means for attaching the springs to the supporting-slats, to connecting-braces for joining the springs one to another, to special cross-braces for stiffening the tops thereof, to a construction of the under slat for imparting thereto a stiffness without a material increase in weight, and to special constructions and combinations of the springs, connecting-braces, slats, and other elements.

The invention contemplates more particularly the use of the springs with extension-tops, described and claimed in Letters Patent No. 254,372, granted February 28, 1882, to myself and SIDNEY ABERNATHY, my assignee, and comprises a certain construction or shape for said extension-tops, as well as special combinations of such springs with other elements; but it is in part applicable to springs of any ordinary or suitable construction.

In the accompanying drawings, which form a part of this specification, Figure 1 is a plan view of a bed-bottom constructed in accordance with the invention, and Figs. 2 to 13, detail views of different parts.

The springs A are wire cones provided with a number of coils at their upper ends, forming extension-tops B. The coils forming the extension-tops are of small pitch, less than that of the body-coils, so that in the normal condition of the spring when relieved of pressure they are not quite horizontal, but rise slightly toward the edge, so that the extension-top is dished or cup-shaped. (See Figs. 2, 4, and 7.) The object of this dishing is mainly to facilitate manufacture by allowing the coils to be wound readily one above another on the coiling cylinder or cone; but it also gives in use a slight resiliency to the extension-top itself.

It is obvious that under a weight the extension-top flattens at once, as shown in Fig. 5.

Instead of making the extension-coils round, they are or may be squared, so that they will fit closer together at the edges. (See Figs. 1, 3, 6.)

Figure 8:
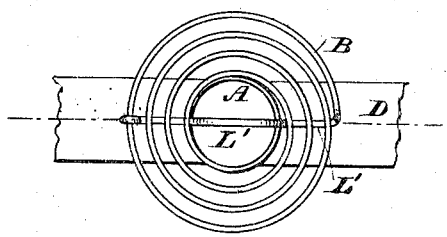
Figure 9:
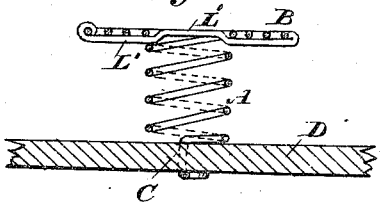
Figure 10:
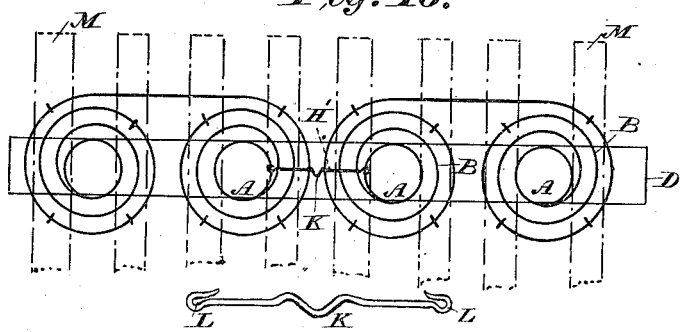
Figure 11:
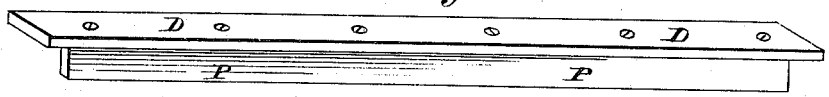
Figure 12:
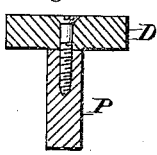

In Figs. 1, 3, 7, and 10 are shown springs with a round top dished or cup-shaped. In Figs 8 and 9 the top, which may be dished when formed, is held flat by the cross-brace.

The springs are provided at their lower ends with bends C, adapted to embrace the supporting-slats D, and with hooks E at the extremity of the lower members of the bends, which hooks receive each a tack, F, (or equivalent device, such as a screw,) driven into the under side of the supporting-slats. The hooks are preferably formed to lie flat against the bottom of the lower surface of the supporting-slats, and the lower members of the bends C are bent sidewise in the middle, as shown at G, Fig. 6, so as to give a larger bearing; but, if desired, the members may be straight, as in Fig. 7, or of a crooked form other than that shown.

It may be observed that heretofore bed-springs have been provided with attaching-bends having hooks at the extremities of their lower members; but said hooks have had the points bent inward or upward, so that they may be sunk into the body of the slat; or they have been united by wire with the bottom coil of the spring, and they have not, so far as I am aware, been secured by a tack in the hook, nor have they had the form above indicated as being preferred for the purposes of this invention.

The springs are connected at their tops by connecting-braces H, that extend diagonally from spring to spring, and which cross or may cross each another brace in the space between the springs. They also pass under the connecting-wires I of the twin springs and under the coils of the extension-tops B.

Figure 13:
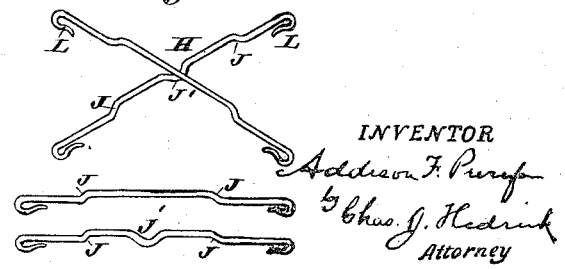

In order that the braces may form a continuation of the extension-tops and a perfect support to the mattress or to the upper slats beyond the said tops, they are bent upward between the springs, so that their upper surfaces will be flush with those of the extension-tops, as shown in Figs. 3, 5, and 13, J indicating the vertical bends and where they cross each other or a connecting-wire, I. A depression is made in one of the braces, as represented by J'; or the depression may be in the connecting-wire, if desired.

In order to perform efficiently their function of bracing and stiffening the springs and uniting them into one system, the braces H are made without joint in the middle, so that the vertical yield is due only to the elasticity of the material composing the same. They may be perfectly straight; but it is preferred to render them slightly extensible or elastic in the direction of their length, and they are therefore provided with one or more lateral or horizontal crooks or bends K. The braces may be attached at the ends to the spring-coils by simply bending the ends around the wire of the coil, as shown in the above-mentioned patent; but to facilitate the attachment they are provided with spring-hooks L, formed integral with each brace by bending the latter on itself. (See Figs. 3 and 13.)

It is not broadly new to combine diagonal braces with the springs of a bed-bottom; but the lateral crooks or bends in said braces, the spring-hooks at the ends, and the special combinations of the diagonal braces with twin springs and extension-top springs are believed to be new improvements.

Besides the diagonal braces H, the straight connection-braces H' and H'' are or may be employed. In order to stiffen the outside of extension-tops in the springs at the ends of the rows, the braces H'', attached at their inner ends to the body-coils of the adjacent springs, are extended across the centers of the outside springs and are attached to the outer coils of the extension-tops, so that they support half the top of one spring and the whole of another.

In case it is desired to stiffen the top of a spring by means additional to or outside of the connecting-braces, which may sometimes be desirable, as in positions where the top is stiffened insufficiently or not at all by such braces, a cross-brace, L', made integral with the spring may be used, the said cross-brace passing under the extension-top B, and being formed (see Figs. 1, 8, and 9) by bending the end of the spring-wire on itself and wrapping it around a coil on opposite side of the spring. Thus constituted, the cross-braces are substitutes for the separate supporting-braces shown in the before-mentioned patent. It is obvious that said separate supporting-braces can be used with the diagonal braces, and that they, like the cross-brace, may be bent upward in the center, as shown at L', so as to be flush with the extension-top.

To arrange the springs and slats in a slat-bed in the most perfect manner, a double row of springs is placed across the bed at the center and a single row at each end, and the upper slats, M, run longitudinally of the bed. The double row in the center is formed by a series of twin springs arranged longitudinally—that is to say, lengthwise of the bed—the two springs of each pair (or twins) being fastened to different supporting-slats, D, by their attaching-bends C; and the end rows are formed of twin springs arranged transversely—that is, across the bed—the two springs of each pair (or twin) being fastened to the same supporting-slat. Where the width of the bed is such that it is not adapted to receive an even number of twin springs transversely the center space is filled by a single spring, as shown. (See Fig. 1.) If it is desired to put more springs under the slats, they can be put under either across or lengthwise of the bed.

The upper slats, M, which run lengthwise of the bed, may be of any desired number, (one or more to each spring;) but it is deemed most advantageous to employ two to a spring and to fasten them to the coils of the extension-tops on opposite sides of the center. The fastening means consist of small wire staples N, which are passed through holes in the upper slats and twisted below around the coils. (See Fig. 2.)

The springs being distributed in the manner indicated, it is obvious that the supporting-slats, especially those in the center, have to bear a greater weight than where the springs are uniformly distributed over the bed. To enable them to resist this weight they are provided on the bottom with strengthening webs or flanges P, placed either at the middle, as in Figs. 2, 4, 5, 11, and 12, or along the edges, as in Fig. 7, as may be preferred. Perforations Q are made in the webs or flanges to receive the lower members of the bends C. In case, however, the web or flange is secured at one edge of the slat and the bend is inserted from the opposite edge, the perforations would be unnecessary. The web or flange may well be made by attaching another slat by screws or similar means, or it can be made in one piece with the body of the slat.

It will be observed that in a slat-bed constructed as indicated there is no frame such as commonly used with slat-beds, so that the bed-bottom can therefore be applied to any ordinary bedstead adapted to receive slats without alteration; and, moreover, it will be observed that the parts can readily be put together or taken apart, and, being separated, can be packed in a small space. Bedsteads of any width can be fitted, it only being required properly to space the springs on the under or supporting slats.

It is obvious that modifications may be made in details without departing from the spirit of the invention, and that portions of the invention may be used separately. For example, the diagonal connecting-braces, with lateral crooks and spring-hooks, may be used with all kinds of single or double springs, with or without extension-tops. So, also, may the cross-braces made integral with the springs. Connecting-braces not diagonal may be provided with the lateral crooks and the spring-hooks.

Diagonal braces of any known or suitable construction can be combined with the extension-top springs. If it is not desired to use the upper slats, the springs are distributed over the regular number of supporting-slots, and are joined by the supporting-braces throughout, the springs being all twin or double, all single, or single and twin combined. In such a case a direct and comparatively firm support to the mattress between the springs is secured at the crossing of the diagonal braces, or at the crossing of the connecting-wire of the twin springs by either or both of said braces. The connection-wire may be bent inward or outward or in any suitable form, or it may extend straight between the two springs of the twin.

The crooks K in the braces H, H', or H'', lying in a plane at right angles to the hooks L, they will rest horizontally or flat against the bottom of the mattress when the hooks are secured to the coils of the spring. Square-top springs or round-topped ones may be used throughout the bed, or the two may be used in conjunction.

Instead of making the tops square, they may be triangular, pentagonal, hexagonal, or polygonal, with a greater or less number of sides. The perfectly-flat tops, as well as those dished in the center, may be made with square or polygonal tops. If desired, the body of the spring could be made with square or polygonal coils. It is obvious, also, that the bed-bottom shown, or different parts of it, could be used in a frame such as commonly employed for slat-beds.

Having thus described my said invention, what I claim, and desire to secure by Letters Patent, is—

1. A spring provided with a dished or cup-shaped extension-top adapted readily to be flattened, and formed of a number of coils of less pitch than the body-coils, substantially as described.

2. A spring provided with an attaching-bend having in the lower member a hook adapted to lie flat against the slat for receiving the tack or its equivalent, substantially as described.

3. The combination, with springs having extension-tops, as explained, of connection-braces diagonally disposed and extending under the extension-tops, so as to stiffen the same, substantially as described.

4. The combination, with twin springs, of connection-braces diagonally disposed and crossing each other, and extending under the connecting-wires of the twin springs, substantially as described.

5. The combination, with an extension-top spring, of a brace located partly under the extension-top to support the same, and having a portion bent upward so as to be flush with said top, substantially as described.

6. The combination, with the springs, of continuous or unjointed wire braces, diagonally disposed and crossing each other between the springs, and provided with lateral crooks, substantially as described.

7. The combination, with springs having extension-tops, of a connection-brace joined at one end to the body-coils of one spring and at the other to the top coils of another spring, so as to support part of one extension-top and the whole of the other, substantially as described.

8. The combination, with the springs having dished or cup-shaped extension-tops formed of a number of coils, of braces extending under said tops and serving to uphold the same when flattened, substantially as described.

9. An extension-top spring having the spring-wire bent across and under the extension-top, so as to form a supporting-brace integral with the spring, substantially as described.

10. In combination with springs having attaching-bends, a supporting slat provided with a web or flange beneath, adapted to allow said bends to embrace the slat without embracing the web or flange, substantially as described.

11. The combination, with springs having flat or nearly flat extension-tops formed of a number of coils, of the upper slats resting on and attached to said springs, substantially as described.

ADDISON F. PUREFOY.

Witnesses:
W. L. POTEAT,
J. T. PUREFOY.